United States Patent
Zhang (10) Patent No.: US 11,203,798 B2
(45) Date of Patent: Dec. 21, 2021

(54) LASER SHOCK PEENING APPARATUS FOR SURFACE OF WORKPIECE, AND LASER SHOCK PEENING METHOD

(71) Applicant: Ningbo Institute of Materials Technology & Engineering, Chinese Academy of Sciences, Zhejiang (CN)

(72) Inventor: Wenwu Zhang, Zhejiang (CN)

(73) Assignee: Ningbo Institute of Materials Technology & Engineering, Chinese Academy of Sciences, Zhejiang (CN)

(*) Notice: Subject to any disclaimer, the term of this patent is extended or adjusted under 35 U.S.C. 154(b) by 166 days.

(21) Appl. No.: 16/407,566

(22) Filed: May 9, 2019

(65) Prior Publication Data
US 2019/0271059 A1 Sep. 5, 2019

Related U.S. Application Data (62) Division of application No. 15/033,289, filed as application No. PCT/CN2014/089554 on Oct. 27, 2014, now Pat. No. 10,876,185.

(30) Foreign Application Priority Data

Oct. 31, 2013 (CN) .......................... 201310534491.3

(51) Int. Cl.
*C21D 10/00* (2006.01)
*B23K 26/12* (2014.01)
(Continued)

(52) U.S. Cl.
CPC ........ *C21D 10/005* (2013.01); *B23K 26/0622* (2015.10); *B23K 26/127* (2013.01); *B23K 26/356* (2015.10); *C21D 7/06* (2013.01)

(58) Field of Classification Search
None
See application file for complete search history.

(56) References Cited

U.S. PATENT DOCUMENTS 4,714,628 A * 12/1987 Eloy ....................... C23C 14/48
118/620
5,744,781 A  4/1998 Yeaton
(Continued)

FOREIGN PATENT DOCUMENTS

CN  1102962  3/2003
CN  1404954  3/2003
(Continued)

OTHER PUBLICATIONS

Supplementary European Extended Search Report.
(Continued)

*Primary Examiner* — Phuong T Nguyen
(74) *Attorney, Agent, or Firm* — Alix, Yale & Ristas, LLP (57) ABSTRACT

A laser shock peening apparatus for the surface of a workpiece, said apparatus comprising a resonant cavity. When said apparatus is used to conduct laser shock peening, because of the presence of the resonant cavity, shock waves that would typically escape outward may instead be utilized, and composite shock waves may be formed as a result of the wave reflection and convergence effects of the resonant cavity. Said waves can then be used on the surface of a workpiece twice or multiple times, thereby greatly increasing energy utilization rates. In addition, a fluid-based confinement layer is limited to the inside of the resonant cavity and has a fixed shape, thereby effectively solving the problems of the poor stability of a fluid-based confinement layer and the difficulty with controlling the thickness of such a confinement layer.

6 Claims, 8 Drawing Sheets

(51) Int. Cl.
*C21D 7/06* (2006.01)
*B23K 26/0622* (2014.01)
*B23K 26/356* (2014.01)

(56) References Cited

U.S. PATENT DOCUMENTS

| | | | |
|---|---|---|---|
| 6,049,058 A | 4/2000 | Dulaney et al. | |
| 6,064,035 A * | 5/2000 | Toller | B23K 26/127 219/121.86 |
| 6,127,649 A * | 10/2000 | Toller | B23K 26/123 219/121.86 |
| 6,288,358 B1 * | 9/2001 | Dulaney | B23K 26/032 219/121.6 |
| 6,359,257 B1 | 3/2002 | Clauer et al. | |
| 2002/0047673 A1 * | 4/2002 | Schall | G21K 1/06 315/501 |
| 2005/0045607 A1 * | 3/2005 | Tenaglia | B23K 26/356 219/121.85 |
| 2008/0105666 A1 * | 5/2008 | Adachi | C21D 7/06 219/121.82 |
| 2008/0146971 A1 * | 6/2008 | Uebelacker | A61B 17/22004 601/4 |
| 2009/0084399 A1 * | 4/2009 | Lee | B08B 7/0042 134/1.1 |
| 2013/0052479 A1 | 2/2013 | Seetharaman et al. | |

FOREIGN PATENT DOCUMENTS

| | | |
|---|---|---|
| CN | 101831529 | 11/2011 |
| CN | 102212655 | 1/2013 |
| CN | 103614541 | 3/2014 |
| CN | 203700450 | 7/2014 |
| EP | 1528110 | 5/2005 |
| FR | 2911080 | 2/2010 |
| JP | A1979010495 | 1/1979 |
| JP | S58120716 | 7/1983 |
| JP | 560218421 | 11/1985 |
| JP | H10113786 | 5/1998 |
| JP | 2008087029 | 4/2008 |
| JP | 2010247213 | 11/2010 |
| JP | 2016526802 | 9/2016 |

OTHER PUBLICATIONS

Abstract of EP1528110A1.
Abstract of JPH10113786A.
Office Action dated May 23, 2017 with its English translation.
Abstract of JP2008087029.
Abstract of JPA1979010495.
Abstract of JPS58120716.
Search Report.

* cited by examiner

LASER SHOCK PEENING APPARATUS FOR SURFACE OF WORKPIECE, AND LASER SHOCK PEENING METHOD

TECHNICAL FIELD OF THE INVENTION

The present invention relates to the technical field of laser shock peening for the surface of a workpiece, and particularly, to a laser shock peening apparatus for the surface of a workpiece and a method for strengthening the surface of the workpiece by the laser shock peening apparatus.

BACKGROUND OF THE INVENTION

Laser shock peening technology is a technology for strengthening the surface of a workpiece through laser shock peening using ultra-high pressure shock waves generated by high power laser. At present, laser shock peening technology is widely used in various fields, such as aviation, shipbuilding, mechanical engineering fields, etc., especially, in anti-fatigue treatment for engine blades of aircraft.

The existing laser shock peening apparatus for the surface of a workpiece comprises a laser generating unit, an absorbing protective layer on the surface of the workpiece, and a confinement layer on the absorbing protective layer. The confinement layer is used for allowing a laser energy to pass through so that the laser energy can act on the absorbing protective layer, and for providing reactive force as much as possible when plasmas expand, thereby improving coupling efficiency of shock waves. At present, in domestic and abroad, solid materials, such as optical glass, etc., are typically used as confinement layer, or flexible materials, such as water film with thickness of about 0.5-1 mm, etc., are used as transparent confinement layer. The absorbing protective layer is used for absorbing laser, generating plasmas, and shielding to avoid damage to workpiece by laser and plasmas. At present, paints, flexible adhesive tapes, metal foils with a certain thickness, etc., are typically used as absorbing protective layer.

Figure 1:
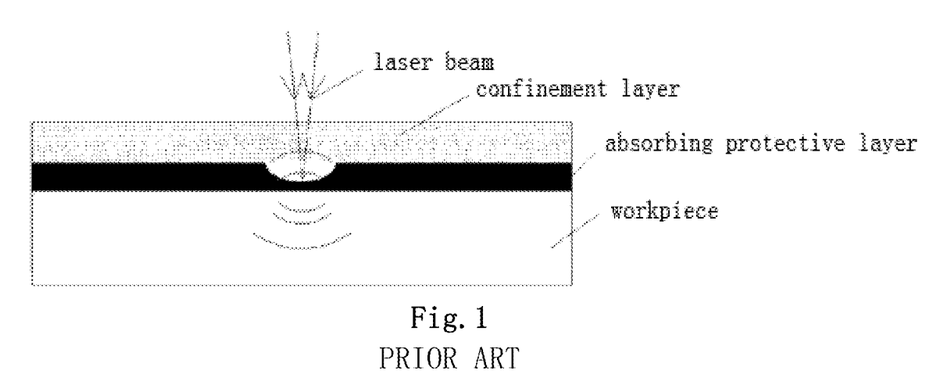
FIG. 1 is a schematic diagram illustrating the process of the laser shock peening in prior art.

The process of laser shock peening is shown in FIG. 1: laser with short pulse (generically within 50 nanoseconds) and high power density ($GW/cm^2$) passes through the transparent confinement layer, and irradiates on the absorbing protective layer applied on or attached to the surface of the workpiece, such as metal and the like; the absorbing protective layer is gasified rapidly to form compact plasmas with high temperature and high pressure after absorbing laser energy, wherein the plasmas warm up sharply and expand to form shock waves after absorbing laser energy unceasingly, and the shock waves have an intensity up to a magnitude of several GPa ($10^9$ Pa), which is well above the yield strength of many workpiece materials; the shock waves pass through the absorbing protective layer, and act on the surface of the workpiece and transmit into the interior of the workpiece, so as to cause plastic deformation and residual compressive stress field in the surface of the workpiece, thereby leading to plastic deformation in the surface materials, increase in dislocation density, grain refinement, improve in compressive stress and hardness, so as to greatly improve fatigue resistance, wear resistance and corrosion resistance of the materials.

For example, the laser shock peening process is utilized by U.S. patent U.S. Pat. No. 5,744,781 titled "method and apparatus for laser shock peening", Chinese patent CN102212655B titled "laser shock method", CN1102962C titled "laser shock peening using low energy laser", and CN101831529B titled "laser impacting treatment reinforcing method for crankshaft fillet" and the like. However, it can be seen from FIG. 1, only about one half of plasma shock waves generated by the absorbing protective layer applied on the surface of the workpiece after absorbing laser energy acts on the surface of the workpiece, and the other half of the plasma shock waves dissipate to the outside. That is, nearly 50% of energy is lost during the process of the existing laser shock peening, which means very low energy utilization ration. Thus, there is no alternative but to improve laser energy in order to achieve predetermined processing effect. At present, lasers used for laser shock peening typically tend to use nanosecond pulse with laser energy far more than 1 joule. However, such a laser has an extremely high price, and meanwhile, the laser system has lower reliability due to working under limiting condition. Thus, it is necessary to improve the energy utilization efficiency of laser shock peening so as to lower the requirement on energy of laser systems, thereby improving processing effect on the premise of ensuring the reliability of laser.

Additionally, as for the confinement layer, water film is widely used due to its advantages, such as lower cost, good flexibility, recyclable, good applicability to complex curved surfaces, etc. However, the confinement layer utilizing the water film has the following problems that: (1) it is hard to stably control the thickness of the water film to about 0.5-1 mm in practical operation, for example, at present, the water film is typically applied from one side through a nozzle, however, the thickness of the water film is easy to vary with the shape and position of the workpiece, and the water film is easy to be damaged or sputter due to shock waves during the process, thereby influencing the uniformity of processing and the reliability of optical devices; and (2) compare with solid confinement, the water film has a deficient confinement rigidity, so that it has poor confinement effect on shock waves, and thus conditions, such as unstable confinement and the like, are easy to occur, which finally leads to attenuation of laser shock peening.

Compare with the water film, confinement layer made of solid, such as glass and the like, has better confinement effect on laser shock waves. However, it has poor processing adaptability, which does not meet the requirement on local shock regions with relatively complex shapes. Additionally, glass may be broken under the effect of plasmas and shock waves, and thus only conforms to single shock, and cannot be used repeatedly.

Chinese invention patent, No. ZL02138338.3, titled "flexible lamina for laser impact treatment" adopts two groups of organic silicone gel solutions with different components and additive, and mixes them according to a certain formula, after said mixture is solidified, a constraining layer is formed, and an energy-absorbing layer of 86-1 type black paint can be sprayed on the constraining layer to form the sticking film integrating energy-absorbing layer and constraining layer into one body and possessing a certain flexibility. The flexible sticking film may forms a sticking film integrating energy-absorbing layer and constraining layer into one body and possessing a certain flexibility, however, its confinement stiffness cannot reach that of glass, and has disadvantages, such as potential quality hazard, for example, existence of bubbles, and complex and tedious manufacturing operation for flexible sticking film, which do not facilitate its promotion in the present field.

SUMMARY OF THE INVENTION

A laser shock peening apparatus for the surface of a workpiece is provided. The laser shock peening apparatus can be used to strengthen the surface of the workpiece by laser shock peening, and can improve the efficiency and reliability of laser shock peening.

Briefly stated, a laser shock peening apparatus for a surface of a workpiece comprises a laser generating unit, an absorbing protective layer on the surface of the workpiece, and a confinement layer on a surface of the absorbing protective layer, wherein a laser generated by the laser generating unit irradiates on the absorbing protective layer after passing through the confinement layer, and then plasma shock waves generated at the absorbing protective layer act on the surface of the workpiece; wherein, the laser shock peening apparatus further comprising a resonant cavity with an open end, wherein, the resonant cavity is provided with a laser inlet for introducing the laser generated by the laser generating unit into the resonant cavity; the resonant cavity is further provided with a fluid inlet through which fluid is injected so as to form the confinement layer;

the open end of the resonant cavity contacts with the absorbing protective layer, so that the confinement layer is restricted in an inner space of the resonant cavity.

The workpiece means a component applied in industrial technical field, and the workpiece comprises any component in which plastic deformation and compressive residual stress field may occurred under the effect of laser shock waves, for example, metal components and the like.

The material for the resonant cavity is not limited, generally, materials with relatively higher tolerance and reflexivity to shock waves are utilized for the resonant cavity, and the materials may comprise, but not limited to, metals, such as SS304 stainless steel, high-density tungsten alloy and the like, as well as ceramic materials and the like.

The internal surface of the resonant cavity is not limited in shape, but may be processed into a shape capable of producing high-efficiency shock waves resonance aggregation, and the shape may comprise ellipsoidal and paraboloidal shapes and the like.

The open end of the resonant cavity is not limited in shape, but the open end may have a round, square, or oblong shape.

The fluid comprises any gas and liquid suitable for transmitting optical energy. The gas comprises, but not limited to, air, nitrogen gas and the like. The liquid comprises, but not limited to, water and solution thereof.

The material for the absorbing protective layer is not limited, and comprises metal foil, black paint, adhesive tape and the like.

The laser generated by the laser generating unit is not limited in wavelength, and wavelengths capable of generating shock waves desired in the resonant cavity may be used, and the wavelengths of the laser comprise 10640/1064/800/532/517/355 nanometers and the like.

Figure 2:
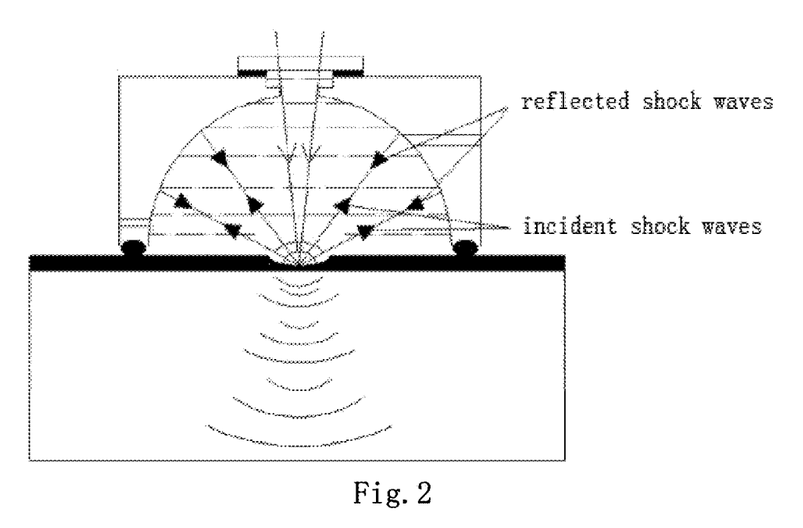
FIG. 2 is a schematic diagram illustrating the process of the laser shock peening using the laser shock peening apparatus of the present disclosure.

In conclusion, the laser shock peening apparatus for the surface of a workpiece employs a resonant cavity, and fluid is utilized as a confinement layer which is totally or partly restricted in an inner space of the resonant cavity. When the apparatus is used for laser shock peening, the process thereof is as shown in FIG. 2. That is, under working state, the laser generated by the laser generating unit irradiates on the absorbing protective layer after passing through the fluid in the resonant cavity, and then the absorbing protective layer is gasified to generate plasmas after absorbing laser energy, and the plasmas expand to form high-intensity spherical shock waves after absorbing laser energy unceasingly. The spherical shock waves propagate in a propagation process A as follows:

propagation process A: a part of the spherical shock waves act on the workpiece and propagate into the workpiece, and another part of the spherical shock waves propagate to the internal surface of the resonant cavity;

the spherical shock waves propagated to the internal surface of the resonant cavity form spherical shock waves again after being reflected by the internal surface of the resonant cavity, and then the above propagation process A is repeated;

the propagation process A is repeated several times in this way. That is, because of the presence of the resonant cavity, shock waves that would dissipate to the outside in the prior art are utilized in the laser shock peening apparatus of the present invention, and composite shock waves may be formed by shock waves induced by one laser pulse due to the wave reflection and convergence effects of the resonant cavity. The shock waves act on the surface of a workpiece two or more times, thereby achieving multiple shocks by one pulse and greatly increasing energy utilization ration.

Figure 3:
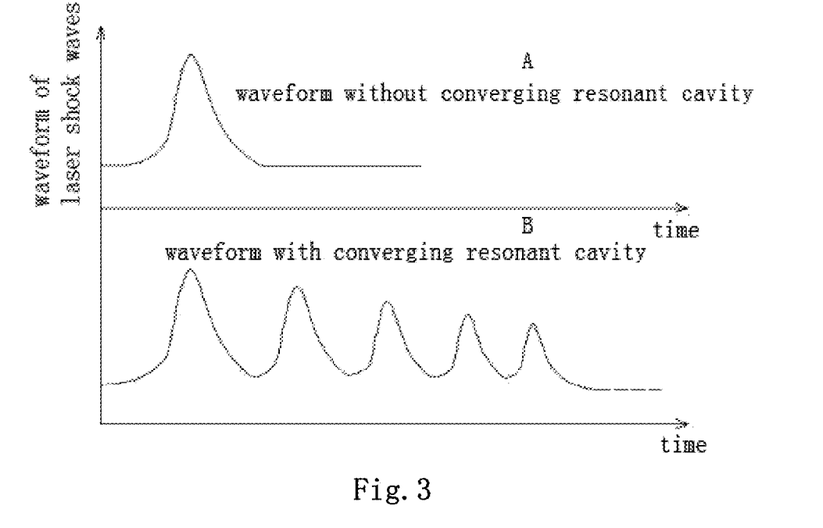
FIG. 3 is a comparison diagram illustrating the waveforms of the shock waves induced by laser pulses in the existing laser shock peening apparatus in prior art and a laser shock peening apparatus of the present disclosure.

FIG. 3 is a schematic diagram illustrating the comparison of waveforms of the shock waves induced by laser pulse in the existing laser shock peening apparatus in prior art and the laser shock peening apparatus with a resonant cavity of the present invention. That is, the existing laser shock peening apparatus may only generate one effective shock wave peak by one pulse, and then shock waves gradually decay, as a result, the shock waves have a relatively shorter duration, about 1-3 times of the laser pulse width, and have a waveform shown in FIG. 3A. However, the laser shock peening apparatus provided by the present invention comprises a resonant cavity, and has a waveform shown in FIG. 3B. The shock waves directly transmitted to the workpiece form a first wave peak, and the shock waves away from the workpiece form a second wave peak after being reflected and converged by the resonant cavity, and this process is repeated, thereby forming two or more effective shock waves, which greatly increases energy utilization ration, and thus the effect of laser shock peening is improved greatly.

On the other hand, the laser shock peening apparatus utilizes fluid as a confinement layer, and the confinement layer is limited to the inside of the resonant cavity, so that the fluid-based confinement layer has a fixed shape, thereby effectively solving the problems of the poor stability of a fluid-based confinement layer and the difficulty with controlling the thickness of such a confinement layer in the prior art.

In order to further optimize the above laser shock peening apparatus, the following optimization measures are further provided.

In consideration that bubbles may be formed and influence the effect of shock peening during the process of forming shock waves again after shock waves are reflected and converged through the resonant cavity, it is preferred that the resonant cavity is further provided with a fluid outlet, and the fluid is injected through the fluid inlet and flows out through the fluid outlet in a flowing state. The optimization measures have the following advantages that:
(1) as the fluid flows indeed, on one hand, flowing fluid reduces the possibility of forming bubbles during formation of shock waves again, and on the other hand, even though a small amount of bubbles is formed in the process, the flowing fluid may bring out the bubbles from the resonant cavity rapidly, which is conducive to decrease the negative effect on shock peening by the bubbles;

(2) as the resonant cavity is provided with the fluid outlet, the internal pressure in the resonant cavity can be inducted and adjusted, thereby enabling to control the distance between the resonant cavity and the workpiece.

In order to prevent the fluid in the resonant cavity from overflowing at the joint between the absorbing protective layer and the resonant cavity, it is preferred to provide a sealing gasket at the joint between the absorbing protective layer and the resonant cavity.

The open end of the resonant cavity contacts with the absorbing protective layer, and the manner of contact comprises hermetical contact and non-hermetical contact. As the confinement layer is fluid, when the open end of the resonant cavity hermetically contacts with the absorbing protective layer, fluid is restricted in the resonant cavity completely, and does not overflow. However, in practical application, it is relatively hard to control the hermetical contact between the open end of the resonant cavity and the absorbing protective layer. When the open end of the resonant cavity and the absorbing protective layer are in contact with each other in a non-hermetical contacting manner, a small amount of fluid overflows at the joint, which does not interfere with the usefulness of the present invention, instead, the overflow of a small amount of fluid facilitates decreasing the friction force between the absorbing protective layer and the resonant cavity.

In order to facilitate the laser to enter the resonant cavity through the laser inlet efficiently, it is preferred to provide a light guiding unit between the laser generating unit and the laser inlet, so that the laser generated by the laser generating unit enters the resonant cavity through the laser inlet efficiently. The light guiding unit may be a flexible light pipe system composed of reflectors, and may be optical fiber and the like.

In order to prevent the plasma shock waves and the fluid from dissipating at the laser inlet during operation, it is preferred that a spacer A, a transparent window film with high pressure resistant and a spacer B are provided at the laser inlet. The transparent window film with high pressure resistant is positioned between the spacer A and the spacer B, and its material comprises, but not limited to, quartz plate, lens sheet, and the like.

The method for strengthening the workpiece by using the laser shock peening apparatus is as follows:
step 1, applying an absorbing protective layer on the surface of the workpiece after cleaning the workpiece;
step 2, contacting the open end of the resonant cavity with the surface of the absorbing protective layer, and injecting the fluid into the resonant cavity through the fluid inlet;
step 3, introducing the laser generated by the laser generating unit into the resonant cavity through the laser inlet, and the laser irradiates on the absorbing protective layer after passing through the fluid, and then shock waves are generated, wherein, the shock waves propagate in a propagation process A as follows:
a part of the shock waves act on the workpiece directly to strengthen the workpiece, meanwhile, another part of the shock waves propagate towards the internal surface of the resonant cavity and form shock waves again after being reflected and converged by the internal surface of the resonant cavity, and then the above propagation process A is repeated;
after the propagation process A being repeated several times, turning off the laser generating unit; and
step 4, unloading the workpiece and cleaning away the absorbing protective layer left on the surface of the workpiece.

In the step 1, the method for applying an absorbing protective layer on the surface of the workpiece comprises, but not limited to, applying paints, adhesive tapes and metal foils.

In order to strengthen different regions of the surface of the workpiece by laser shock peening, in the process, it is preferred to adjust the position where the open end of the resonant cavity contacts with the surface of the absorbing protective layer, that is, after the step 3 and before the step 4, step 3' as following is performed once or more times:
step 3', changing the position where the open end of the resonant cavity contacts with the surface of the absorbing protective layer, and repeating the step 3;
wherein, in the step 3', the manner to change the position where the open end of the resonant cavity contacts with the surface of the absorbing protective layer is not limited. For example, a movable system may be used to move the workpiece and the laser shock peening apparatus. The movement patterns comprise only moving either the workpiece or the laser shock peening apparatus, or moving both of the workpiece and the laser shock peening apparatus, so as to adapt to processing requirements of workpieces with various dimensions.

In order to further improve the efficiency of laser shock peening for the workpiece, it is preferred to use the method for strengthening an upper surface and a lower surface of the workpiece by utilizing two laser shock peening apparatuses concurrently, and the specific process is as follows:
step 1, applying absorbing protective layers on the upper surface and the lower surface of the workpiece respectively after cleaning the workpiece;
step 2, contacting the open ends of two resonant cavities of the two laser shock peening apparatuses with the absorbing protective layers on the upper surface and the lower surface respectively, and then injecting fluid into the resonant cavities through the fluid inlets respectively;
step 3, introducing lasers generated by laser generating units of the two laser shock peening apparatuses into the resonant cavities through the two laser inlets respectively, and the lasers irradiate on the absorbing protective layers after passing through the fluid, and then shock waves are generated at the absorbing protective layers, wherein, the shock waves propagate in a propagation process A as follows:
a part of the shock waves act on the workpiece directly to strengthen the workpiece, meanwhile, another part of the shock waves propagate towards the internal surfaces of the resonant cavities and form shock waves again after being reflected and converged by the internal surfaces of the resonant cavities, and then the above propagation process A is repeated;
after the propagation process A being repeated several times, turning off the laser generating units; and
step 4, unloading the workpiece and cleaning away the absorbing protective layers left on the surfaces of the workpiece.

In the above-mentioned two methods, in consideration that bubbles may be formed and influence the effect of shock peening during the process of forming shock waves again after shock waves are reflected and converged through the resonant cavity, it is preferred that the resonant cavity is further provided with a fluid outlet, and in the step 2, the fluid is injected through the fluid inlet and flows out through fluid outlet in a flowing state.

The reference numbers in the accompanying drawings comprise: 1. flow control valve; 2. water tank; 3. miniature water pump; 4. workpiece; 5. fluid outlet; 6. absorbing protective layer; 7. second connection port; 8. pipe; 9. computer; 10. laser generating unit; 11. light transmission unit; 12. connector for light transmission unit; 13. laser inlet; 14. plano-convex collimating lens; 15. plano-convex focusing lens; 16. spacer A; 17. high pressure resistant glass; 18. spacer B; 19. resonant cavity; 20. deionized water; 21. first connection port; 22. fluid inlet; 23. sealing gasket.

DETAILED DESCRIPTION OF EMBODIMENTS OF THE INVENTION

Hereinafter, the present invention will be described in details in connection with the accompanying drawings and embodiments, it should be noted that the following embodiments are intended to be convenient for understanding the present invention, but does not limit the present invention.

Embodiment 1

Figure 4:
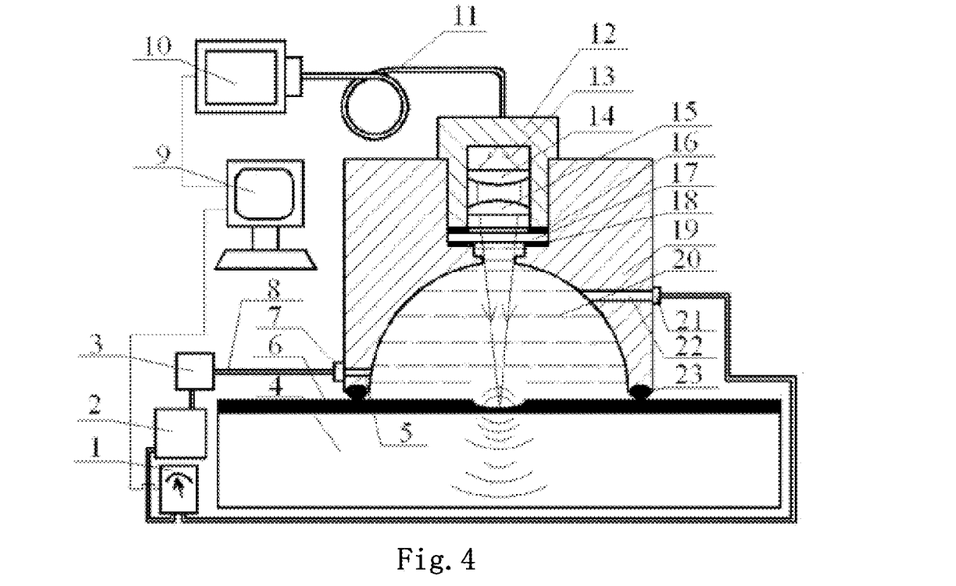
FIG. 4 is a schematic diagram illustrating the laser shock peening apparatus using water as confinement medium in embodiment 1 of the present invention.

In the present embodiment, a laser shock peening apparatus, as shown in FIG. 4, comprises a laser generating unit 10 and a resonant cavity 19 with an open end, and the open end of the resonant cavity 19 hermetically contacts with the surface of an absorbing protective layer 6, thereby forming a "backoff" structure. The resonant cavity 19 is further provided with a laser inlet 13, a fluid inlet 22 and a fluid outlet 5.

The absorbing protective layer 6 is provided on the surface of the workpiece 4 to be processed, in the present embodiment, the workpiece 4 is a metal workpiece, and the absorbing protective layer 6 is a piece of aluminum foil. The confinement layer 20 is provided on the surface of the absorbing protective layer 6. The confinement layer 20 is located in the resonant cavity 19, and the confinement layer 20 is deionized water injected through the fluid inlet 22. The deionized water is pumped into the resonant cavity 19 through the pipes 8 and the fluid inlet 22 by pumping the deionized water of the external water tank 2 by using a miniature water pump 3, and pumped out from the resonant cavity 19 through the fluid outlet 5, and thus the water runs in a flowing state. The connection port connecting the pipes 8 and the fluid inlet 22 is the first connection port 21, and the connection port connecting the pipes 8 and the fluid outlet 5 is the second connection port 7. A flow control valve is further provided to detect fluid flow.

Figure 5:
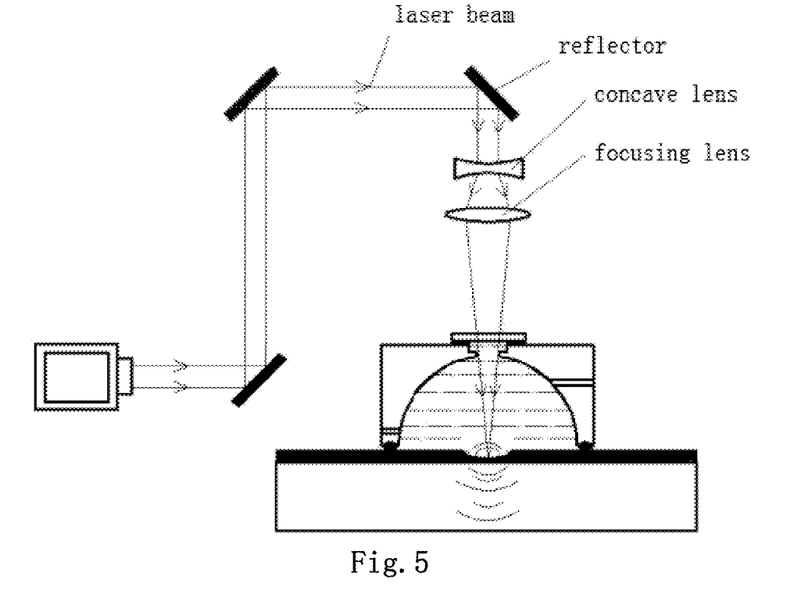
FIG. 5 is a light guiding unit using optical devices in embodiment 1 of the present invention.
Figure 6:
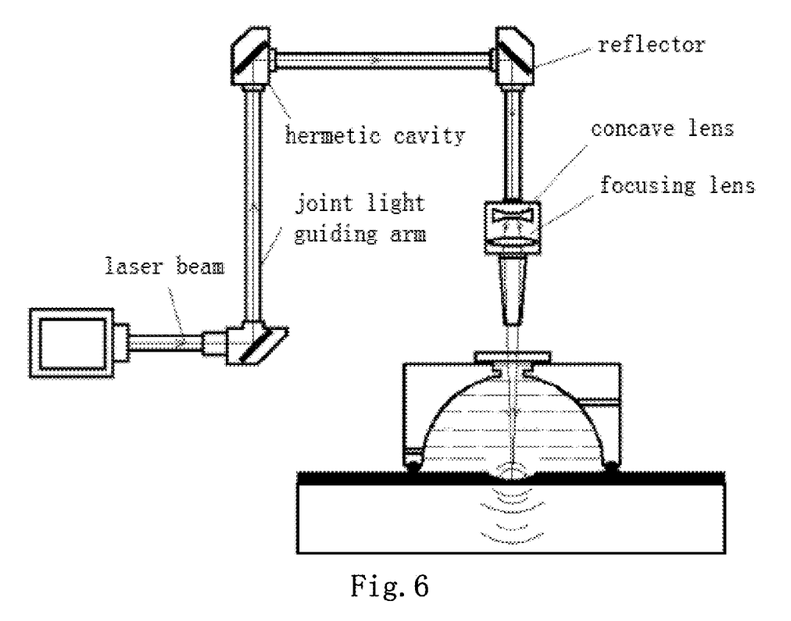
FIG. 6 is a light guiding unit using multi-joint light guiding arm in embodiment 1 of the present invention.
Figure 7:
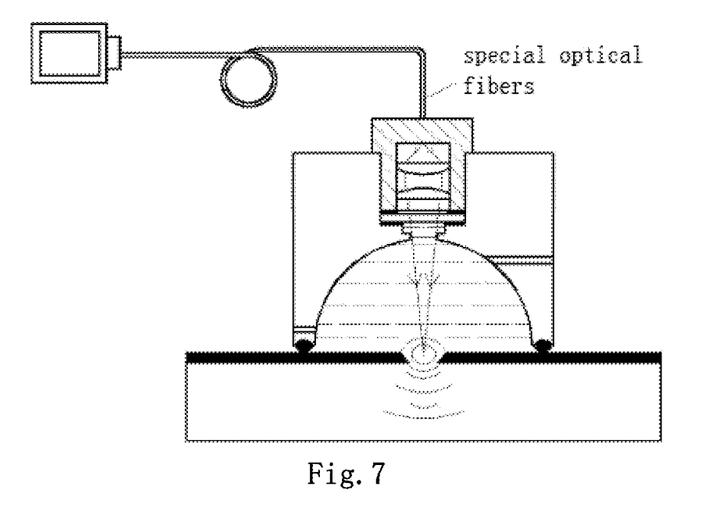
FIG. 7 is a light guiding unit using special optical fiber in embodiment 1 of the present invention.
Figure 8:
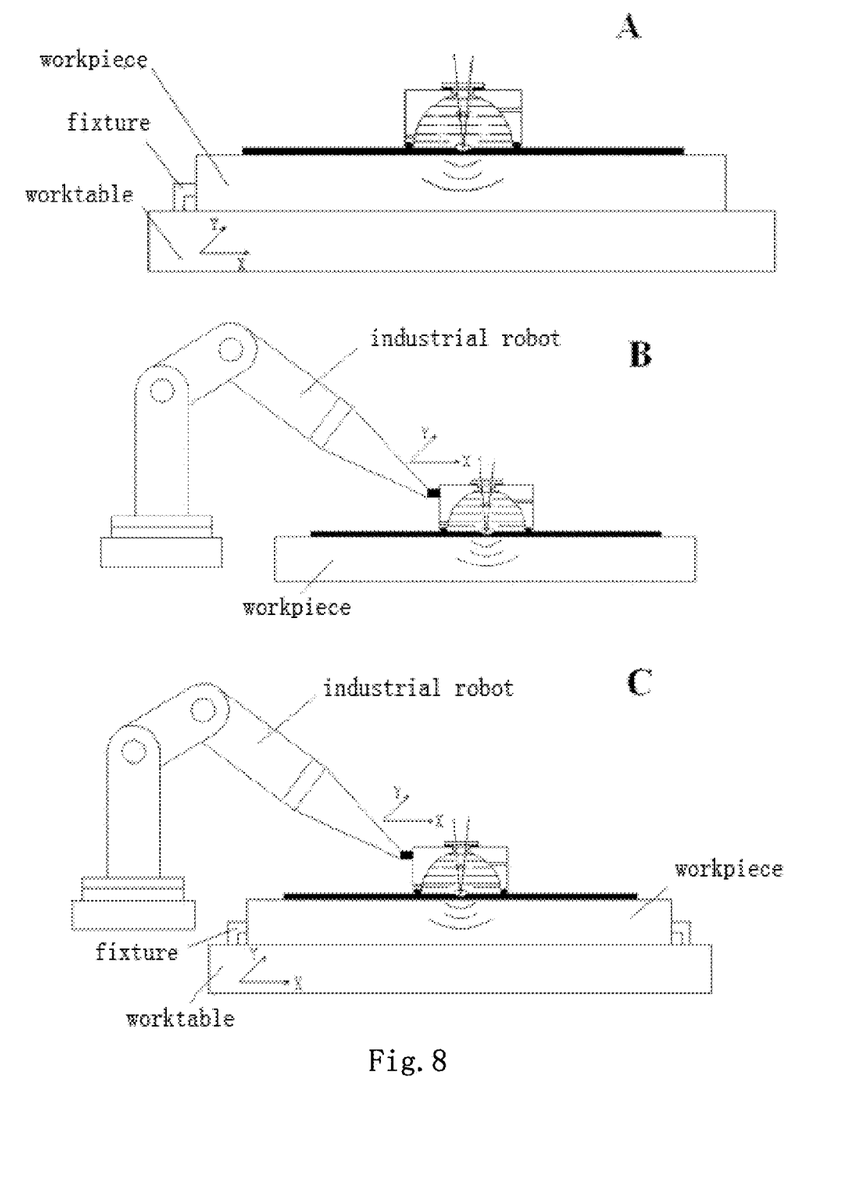
FIG. 8 shows three movement patterns during shock process in embodiment 1 of the present invention.

In order to facilitate the laser to enter the resonant cavity 19 through the laser inlet 13 efficiently and steadily, a light guiding unit is provided between the laser generating unit 10 and the laser inlet 13, so that the laser generated by the laser generating unit enters the resonant cavity through the laser inlet efficiently. The light guiding unit is composed of a light transmission unit 11, a connector 12 for light transmission unit, a plano-convex collimating lens 14 and a plano-convex focusing lens. In practical application, the light guiding unit may also employ other forms, and FIG. 5 shows the light guiding unit using optical devices, FIG. 6 shows the light guiding unit using multi-joint light guiding arm, and FIG. 7 shows the light guiding unit using special optical fiber.

In order to prevent the plasma shock waves from dissipating at the laser inlet 13 during operation, a first spacer 16, a high pressure resistant glass 17 and a second spacer 18 are provided at the laser inlet 13. The high pressure resistant glass 17 is located between the first spacer 16 and the second spacer 18, and the high pressure resistant glass 17 is made of quartz plate or lens sheet.

In order to enhance the leakproofness between the resonant cavity 19 and the absorbing protective layer 6, a sealing gasket 23 is provided at the position where the resonant cavity 19 contacts with the absorbing protective layer 6.

A computer 9 is used for controlling the laser generating unit 10 and the miniature water pump 3.

The method for strengthening the workpiece by using the laser shock peening apparatus is as follows:

step (1), cleaning the workpiece with liquid such as acetone, alcohol and the like, and airing the workpiece, and then applying the absorbing protective layer 6 made of an aluminum foil on the surface of the metal workpiece 4;

step (2), hermetically contacting the open end of the resonant cavity 19 with the surface of the absorbing protective layer 6 through the sealing gasket 23; filling the resonant cavity 19 with deionized water 20 through the fluid inlet 22 by actuating the water pump 3, and enabling the deionized water 20 to flow through the fluid outlet 5; and adjusting the flow rate of the deionized water 20 to about 0.2 ml/s by adjusting the flow control valve 1;

step (3), actuating the laser generating unit 10 under the control of the computer 9, wherein, the laser generating unit 10 is a Nd:YAG solid pulsed laser generating unit with a wavelength of 532 nm, a pulse width of 25 nanoseconds, and a pulse energy of 1-10 joules; adjusting parameters of the pulsed laser device 10, so that the parameters meet the requirements of the experiment; emitting laser beam 13 from the laser generating unit 10, so as to transmit the laser to the connector 12 for light transmission unit via the light transmission unit 11; adjusting the position of the plano-convex focusing lens 15 in the connector 12, so as to enable the laser 13 to irradiate on the absorbing protective layer 6 through the deionized water; the absorbing protective layer 6 being gasified rapidly and forming compact plasmas with high temperature and high pressure after absorbing laser energy, and the plasmas expanding to form high-intensitive spherical shock waves after absorbing laser energy unceasingly, wherein, a part of the spherical shock waves facing the workpiece 4 directly act on the workpiece 4 to strengthen the workpiece 4, meanwhile, other part of the spherical shock waves, which act as incident waves, form focused and reflected waves at a position adjacent to the focus point of the laser 13 after being reflected by the internal surface of the resonant cavity 19, and become shock waves again to repeat the above process, thereby forming composite shock waves to strengthen the workpiece 4 two or more times by shock peening; and step (4): after finishing the laser shock, turning off the laser generating unit 10 and the water pump 3 successively under the control of the computer 9, unloading the workpiece 4, and finally, removing the absorbing protective layer 6 left on the surface of the workpiece 4.

Figure 10:
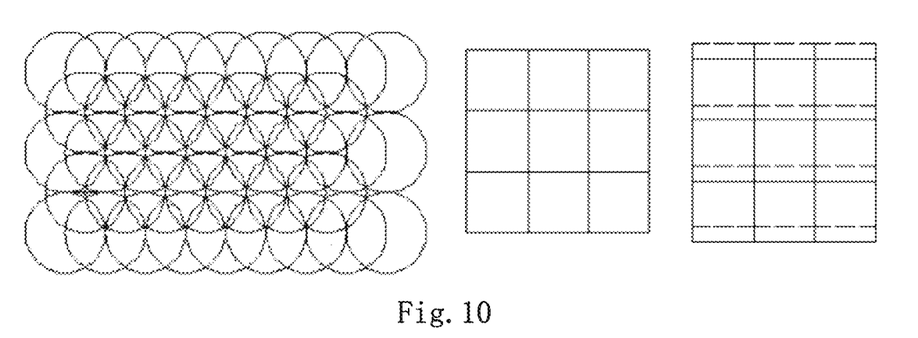
FIG. 10 shows superimposed tracks in the shock region of the resonant cavity with the shapes of end shown in FIG. 9.

In order to strengthen different regions of the surface of the workpiece 4 by laser shock peening, a movable system is employed in the present embodiment to enable a relative movement to occur between the workpiece 4 and the laser shock peening apparatus. Particularly, a movable workbench enabling the workpiece to move is employed (as illustrated in FIG. 10A), or an industrial robot enabling the laser shock peening apparatus to move is employed (as illustrated in FIG. 10B), or a manner enabling both of the workpiece and the laser shock peening apparatus to move is employed (as illustrated in FIG. 10C), so as to adapt to processing requirements of workpiece with various dimensions.

The specific processing method is as follows: in the above process, adjust the position where the open end of the resonant cavity 19 contacts with the surface of the absorbing protective layer 6, that is, after the above step (3) and before the step (4), step (3') as following is performed once or more times:

step (3'), changing the position where the open end of the resonant cavity 19 contacts with the surface of the absorbing protective layer 6 under the action of the movable system, and repeating the step (3).

Figure 9:
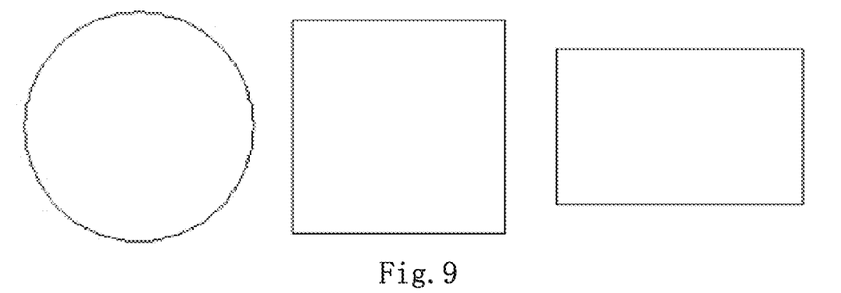
FIG. 9 is a schematic diagram illustrating different shapes of the outlet end of the resonant cavity in embodiment 1 of the present invention.

Under the action of the movable system, superimposed tracks are formed in the shock regions of the surface of the workpiece. As shown in FIG. 9 and FIG. 10, when the outlet end of the resonant cavity 19 has different shapes (round, square, or rectangular shapes) illustrated in FIG. 9, the superimposed tracks formed in the shock regions are as illustrated in FIG. 10.

Figure 11:
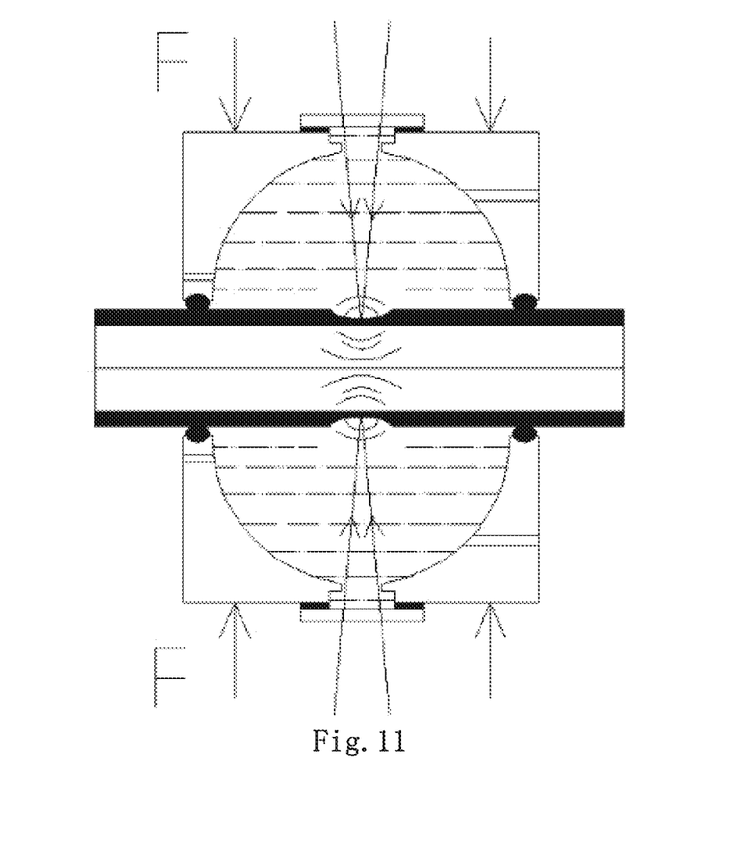
FIG. 11 is a schematic diagram illustrating a two-way laser shock peening system utilized in embodiment 1 of the present invention.

In order to further improve the efficiency of laser shock peening for the workpiece 4, it is possible to use the method for concurrently strengthening the upper and lower surfaces of the workpiece 4 by utilizing two laser shock peening apparatuses, as illustrated in FIG. 11, the specific process is as follows:

step (1), cleaning the workpiece 4 with liquid such as acetone, alcohol and the like, and airing the workpiece, and then applying the absorbing layers made of aluminum foils on the surfaces of the metal workpiece 4;

step (2), hermetically contacting the open ends of the two resonant cavities in the two laser shock peening apparatuses with the surfaces of the absorbing protective layers through the sealing gaskets; filling each of the resonant cavities with deionized water through respective fluid inlet by actuating the water pump, and enabling the deionized water to flow through the fluid outlets; and adjusting the flow rate of the deionized water by adjusting the flow control valve;

step (3), actuating the laser generating units of the two apparatuses under the control of the computer, adjusting parameters of the laser units respectively, so that the parameters meet the requirements of the experiment; emitting lasers from the laser generating units, so as to transmit the lasers to the resonant cavities via the light guiding units, and enabling the lasers to irradiate on the absorbing protective layers after transmitting through the deionized water; the absorbing protective layers being gasified rapidly and forming compact plasmas with high temperature and high pressure after absorbing laser energy, and the plasmas expanding to form high-intensitive spherical shock waves after absorbing laser energy unceasingly, wherein, a part of the spherical shock waves facing the workpiece 4 directly act on the workpiece 4 to strengthen the workpiece 4, meanwhile, other part of the spherical shock waves, which act as incident waves, form focused and reflected waves at a position adjacent to the focus points of the lasers after being reflected by the internal surfaces of the resonant cavities, and become shock waves again to repeat the above process, thereby forming composite shock waves on both of the upper and lower surfaces of the workpiece to strengthen the workpiece 4 two or more times by shock peening; and step (4): after finishing the laser shock, turning off the two laser generating units and the water pump successively under the control of the computer, unloading the workpiece 4, and finally, removing the absorbing protective layers left on the upper and lower surfaces of the workpiece 4.

Embodiment 2

Figure 12:
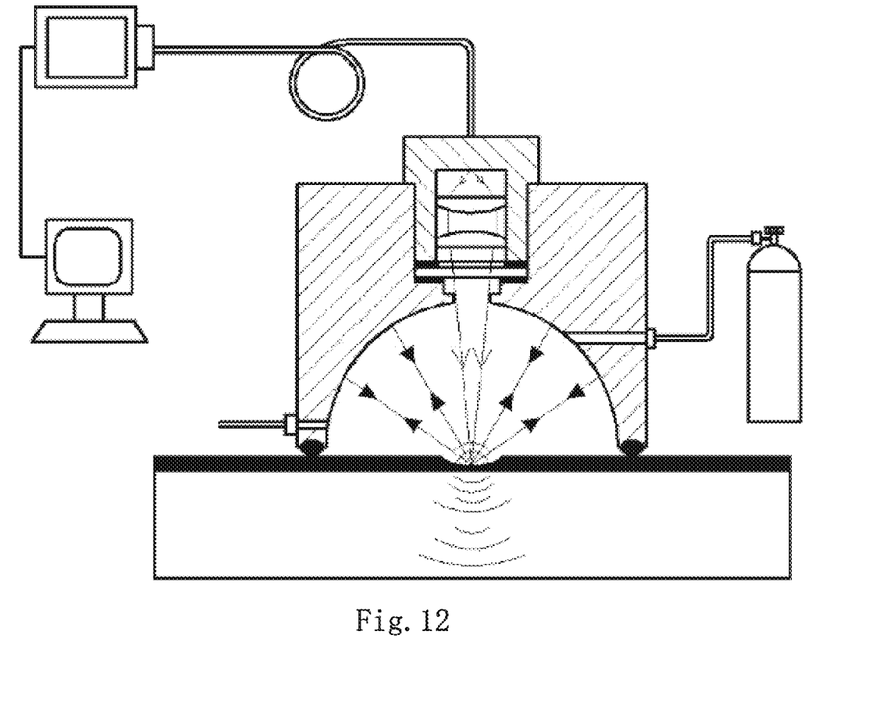
FIG. 12 is a schematic diagram illustrating the laser shock peening apparatus using air as confinement medium in embodiment 2 of the present invention.

In the present embodiment, a laser shock peening apparatus, as shown in FIG. 12, comprises a laser generating unit and a resonant cavity with an open end, wherein, the open end of the resonant cavity and the surface of an absorbing protective layer are contact with each other in a non-hermetical contacting manner, thereby forming a "backoff" structure. The resonant cavity is further provided with a laser inlet, a fluid inlet and a fluid outlet.

The absorbing protective layer is provided on the surface of the workpiece to be processed, in the present embodiment, the workpiece is a metal workpiece, and the absorbing protective layer is a piece of aluminum foil. The confinement layer is provided on the surface of the absorbing protective layer. The confinement layer is located in the resonant cavity, and the confinement layer is gas, such as air, nitrogen gas and the like, injected through the fluid inlet. The gas is pumped into the resonant cavity through the fluid inlet by pumping the gas of the external gas tank by using a gas pump, and pumped out from the resonant cavity through the fluid outlet in a flowing state.

In order to facilitate the laser to enter the resonant cavity through the laser inlet efficiently, a light guiding unit is provided between the laser generating unit and the laser inlet, so that the laser generated by the laser generating unit enters the resonant cavity through the laser inlet efficiently. The light guiding unit is composed of a light transmission unit, a connector for light transmission unit, a plano-convex collimating lens and a plano-convex focusing lens. In practical application, the light guiding unit may also employ other forms.

In order to prevent the plasma shock waves from dissipating at the laser inlet during operation, a first spacer, a high pressure resistant glass and a second spacer are provided at the laser inlet. The high pressure resistant glass is located between the first spacer and the second spacer, and the high pressure resistant glass is made of quartz plate or lens sheet.

As the contact position of the resonant cavity and the absorbing protective layer is non-hermetical, a small amount of gas overflows at the contact position, which does not interfere with the usefulness of the present embodiment, instead, the overflow of a small amount of gas facilitates decreasing the friction force between the absorbing protective layer and the resonant cavity.

The method for strengthening the workpiece by using the laser shock peening apparatus is similar to that in embodiment 1, and not recited herein again.

The technical solutions of the present invention are particularly described with reference to the above embodiments, and it will be understood that the above mentioned are only particular embodiments of the present invention, but not for limiting the present invention, and thus any modifications, supplements, equivalent substitutions and the like within the principle of the present invention should be incorporated into the scope of protection of the present invention.

The invention claimed is:

1. A method for strengthening a surface of a workpiece, wherein the method comprises the following steps:
   step 1, firstly, applying an absorbing protective layer on the surface of the workpiece after cleaning the workpiece;
   step 2, then, contacting an open end of a resonant cavity with the surface of the absorbing protective layer, and injecting fluid into the resonant cavity through a fluid inlet, an internal surface of the resonant cavity has an ellipsoidal shape or a paraboloidal shape;
   step 3, introducing a laser generated by a laser generating unit into the resonant cavity through a laser inlet, and the laser irradiates on the absorbing protective layer after passing through the fluid, and then spherical shock waves are generated at the absorbing protective layer, wherein the spherical shock waves propagate in a propagation process A as follows:
   a part of the spherical shock waves act on the workpiece directly to strengthen the workpiece, meanwhile, another part of the spherical shock waves propagate towards an internal surface of the resonant cavity, and form spherical shock waves again after being reflected and converged by the internal surface of the resonant cavity,
   and then repeating the above propagation process A;
   after the propagation process A being repeated several times, turning off the laser generating unit; and
   step 4, unloading the workpiece and cleaning away the absorbing protective layer left on the surface of the workpiece.

2. The method according to claim 1, wherein after the step 3 and before the step 4, step 3' as follows is performed once or more times:
   step 3', changing a position where the open end of the resonant cavity contacts with the absorbing protective layer, and then repeating the step 3.

3. The method according to claim 1, wherein the resonant cavity is further provided with a fluid outlet, and in the step 2, the fluid is injected through the fluid inlet and flows out through the fluid outlet in a flowing state.

4. A method for strengthening surfaces of a workpiece, characterized by strengthening an upper surface and a lower surface of the workpiece concurrently, and a specific process is as follows:
   step 1, firstly, preparing absorbing protective layers on the upper surface and the lower surface of the workpiece respectively after cleaning the workpiece;
   step 2, then, contacting open ends of two resonant cavities with the absorbing protective layers on the upper surface and the lower surface, and then injecting fluid into the resonant cavities through fluid inlets respectively, internal surfaces of the resonant cavities have an ellipsoidal shape or a paraboloidal shape;
   step 3, introducing lasers generated by laser generating units into the resonant cavities through two laser inlets respectively, and the lasers irradiate on the absorbing protective layers after passing through the fluid, and then spherical shock waves are generated, wherein the spherical shock waves propagate in a propagation process A as follows:
   a part of the spherical shock waves act on the workpiece directly to strengthen the workpiece, meanwhile, another part of the shock waves propagate towards internal surfaces of the resonant cavities and form spherical shock waves again after being reflected and converged by the internal surfaces of the resonant cavities,
   and then repeating the above propagation process A;
   after the propagation process A being repeated several times, turning off the laser generating units; and
   step 4, unloading the workpiece and cleaning away the absorbing protective layers left on the surfaces of the workplace.

5. The method according to claim 4, wherein after the step 3 and before the step 4, step 3' as follows is performed once or more times:
   step 3', changing positions where the open ends of the resonant cavities contact with the absorbing protective layers on the upper surface and the lower surface respectively, and then repeating the step 3.

6. The method according to claim 4, wherein each of the resonant cavities is further provided with a fluid outlet, and in the step 2, the fluid is injected through the fluid inlets and flows out through fluid outlets in a flowing state.

* * * * *